United States Patent [19]

Ogee

[11] Patent Number: 5,433,140
[45] Date of Patent: Jul. 18, 1995

[54] ILLUMINATED BREAD BOX

[76] Inventor: Larry S. Ogee, Rte. 2 Box 466, McLoud, Okla. 74851

[21] Appl. No.: 297,369

[22] Filed: Aug. 29, 1994

[51] Int. Cl.6 .............................................. A47J 47/12
[52] U.S. Cl. ........................................ 99/451; 99/467; 99/646 C; 99/DIG. 14; 220/334; 312/71; D7/609
[58] Field of Search ............. 99/451, 467, 483, 646 R, 99/646 C, DIG. 14; D7/609; 220/331, 334, 378; 250/493.1, 504 R; 312/328, 351, 292, 284, 71; 362/154, 155; 392/411, 424; 313/112; 385/147, 901; 422/24; 426/248

[56] References Cited

U.S. PATENT DOCUMENTS

| | | | |
|---|---|---|---|
| D. 283,481 | 4/1986 | Schmidt | D7/609 |
| 694,261 | 2/1902 | Ellis | 99/451 |
| 2,013,675 | 9/1935 | Steerup | 99/451 |
| 3,092,503 | 5/1963 | Gray | 99/467 |
| 4,034,890 | 7/1977 | Baller | 220/334 |
| 4,103,805 | 8/1978 | Silverstein | 312/328 |
| 4,213,540 | 7/1980 | Stanford | 221/150 R |
| 4,320,932 | 3/1982 | Giffin | 312/71 |
| 4,500,145 | 2/1985 | Fassauer | 312/71 |
| 4,596,935 | 6/1986 | Lumpp | 392/411 |
| 4,974,922 | 12/1990 | Mori | 385/147 |

Primary Examiner—Timothy F. Simone

[57] ABSTRACT

An illuminated bread box for holding bread therein and inhibiting its spoilage comprising a hollow container having an opening for allowing bread to be placed therein; a lamp disposed within the container for emitting illumination when electrically energized to inhibit the growth of organisms in and on bread that leads to its spoilage; a power supply mechanism for providing electrical energy for illuminating the lamp; a lid extended over the opening and pivotally coupled to the container, thereby allowing the container to be opened and closed; and a switch mechanism coupled between the lamp and the power supply mechanism and having one orientation for energizing the lamp when the lid is closed and another orientation for de-energizing the lamp when the lid is opened.

6 Claims, 3 Drawing Sheets

ILLUMINATED BREAD BOX

BACKGROUND OF THE INVENTION

1. Field of the Invention

The present invention relates to an illuminated bread box and more particularly pertains to holding bread therein and inhibiting its spoilage through the use of ultraviolet lighting with an illuminated bread box.

2. Description of the Prior Art

The use of bread boxes is known in the prior art. More specifically, bread boxes heretofore devised and utilized for the purpose of holding bread are known to consist basically of familiar, expected and obvious structural configurations, notwithstanding the myriad of designs encompassed by the crowded prior art which have been developed for the fulfillment of countless objectives and requirements.

By way of example, U.S. Pat. No. Des. 283,481 to Schmidt discloses a food container or the like. U.S. Pat. No. 4,871,559 to Dunn et al. discloses methods for preservation of foodstuffs. U.S. Pat. No. 5,034,235 to Dunn et al. discloses methods for preservation of foodstuffs. U.S. Pat. No. 5,069,017 to Fabricius discloses an aseptic filling machine for food.

While these devices fulfill their respective, particular objective and requirements, the aforementioned patents do not describe an illuminated bread box that used special illumination for keeping bread contained therein from readily spoiling.

In this respect, the illuminated bread box according to the present invention substantially departs from the conventional concepts and designs of the prior art, and in doing so provides an apparatus primarily developed for the purpose of holding bread therein and inhibiting its spoilage through the use of ultraviolet lighting.

Therefore, it can be appreciated that there exists a continuing need for new and improved illuminated bread box which can be used for holding bread therein and inhibiting its spoilage through the use of ultraviolet lighting. In this regard, the present invention substantially fulfills this need.

SUMMARY OF THE INVENTION

In the view of the foregoing disadvantages inherent in the known types of bread boxes now present in the prior art, the present invention provides an improved illuminated bread box. As such, the general purpose of the present invention, which will be described subsequently in greater detail, is to provide a new and improved illuminated bread box and method which has all the advantages of the prior art and none of the disadvantages.

To attain this, the present invention essentially comprises, in combination, a rigid, hollow, and generally box-shaped container having a rectangular and horizontal lower wall, a rectangular and horizontal upper wall, a vertical rear wall, opposed and vertical side walls, and a upwardly extended front wall having a vertical lower portion and an upper portion extended inwardly at an angle from the lower portion to the upper wall with the angle formed between the upper and lower portions being between about 100 degrees to about 120 degrees. The upper portion of the front wall has a rectangular opening therethrough for allowing bread to be placed within the container. A rectangular lid is included and has an outer surface and inner surface and a periphery having a top edge, bottom edge, and opposed side edges. The lid is extended over the opening of the container with bottom edge thereof pivotally coupled to the front wall at the juncture of the lower portion with the upper portion. The lid further includes a lid fastener coupled thereto positioned near the midpoint of the top edge with the lid fastener having a handle extended from the upper surface of the lid for allowing a user a firm grip for opening and closing the opening of the container and a latch coupled to the inner surface of the lid for securing the lid to the container. A lamp is disposed within the container and coupled to the upper wall at a location near the rear wall with the lamp emitting ultraviolet illumination when electrically energized for inhibiting the growth of organisms in and on bread that leads to its spoilage. A power cable is included for providing electrical energy and has a terminal end extended within the container and a plug end extended remote from the container for coupling with an external electrical power source. A switch is disposed within the container and coupled to the upper portion of the front wall with the switch having a depressible button extended through the upper portion at a position for contacting the lower surface of the lid and a terminal coupled between the lamp and terminal end of the power source. When the lid is closed, the button portion of the switch is depressed and the lamp is energized. When the lid is opened, the button is released and the lamp is de-energized. Lastly, four rubber feet are included with each foot coupled near a corner of the lower wall of the container and extended downwards therefrom for preventing the container from sliding when held on a surface.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved illuminated bread box which has all the advantages of the prior art bread boxes and none of the disadvantages.

It is another object of the present invention to provide a new and improved illuminated bread box which may be easily and efficiently manufactured and marketed.

It is a further object of the present invention to provide a new and improved illuminated bread box which is of durable and reliable construction.

An even further object of the present invention is to provide a new and improved illuminated bread box which is susceptible of a low cost of manufacture with regard to both materials and labor, and which accordingly is then susceptible of low prices of sale to the consuming public, thereby making such an illuminated bread box economically available to the buying public.

Still yet another object of the present invention is to provide a new and improved illuminated bread box which provides in the apparatuses and methods of the prior art some of the advantages thereof, while simultaneously overcoming some of the disadvantages normally associated therewith.

Even still another object of the present invention is to provide a new and improved illuminated bread box for holding bread therein and inhibiting its spoilage through the use of ultraviolet lighting.

Lastly, it is an object of the present invention to provide a new and improved illuminated bread box comprising a hollow container having an opening for allowing bread to be placed therein; a lamp disposed within the container for emitting illumination when electrically energized to inhibit the growth of organisms in and on bread that leads to its spoilage; power supply means for providing electrical energy for illuminating the lamp; a lid extended over the opening and pivotally coupled to the container, thereby allowing the container to be opened and closed; and switch means coupled between the lamp and power supply means and having one orientation for energizing the lamp when the lid is closed and another orientation for de-energizing the lamp when the lid is opened.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
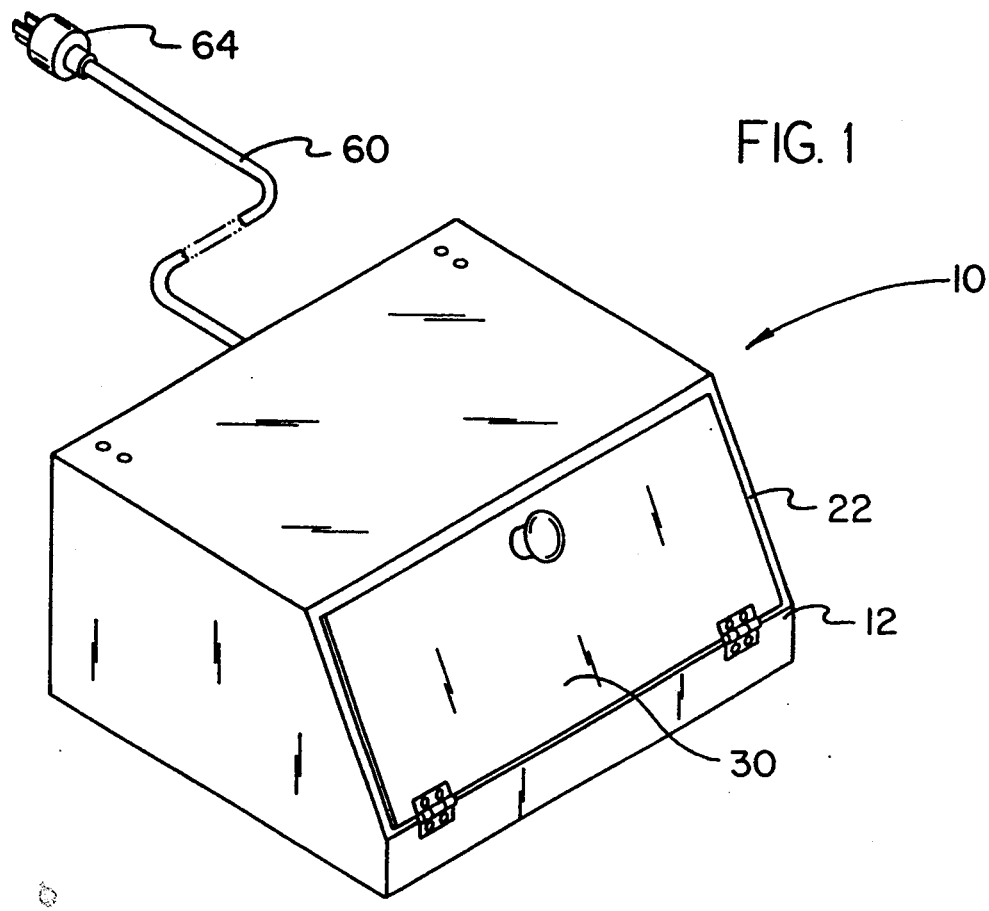
FIG. 1 is a perspective view of the preferred embodiment of the illuminated bread box constructed in accordance with the principles of the present invention.
Figure 2:
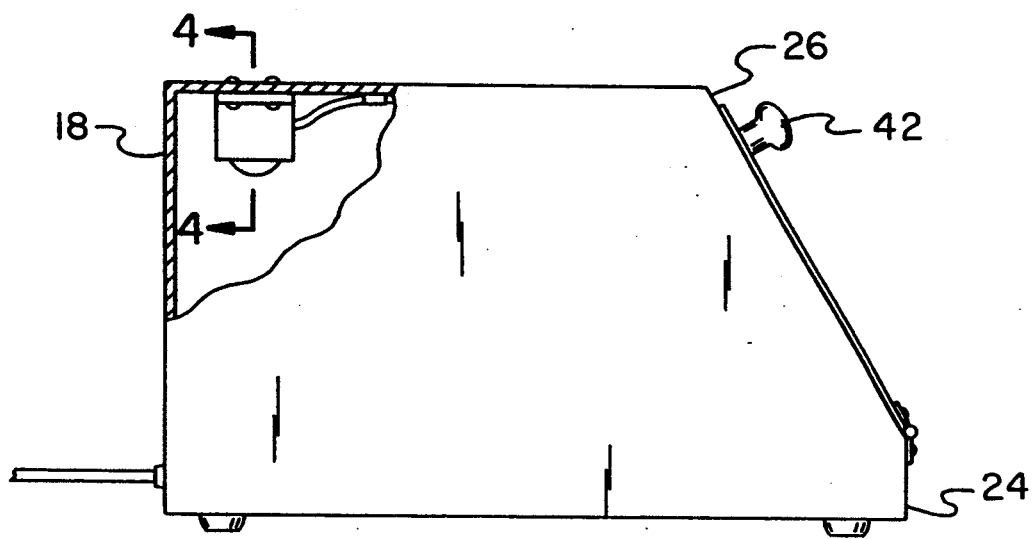
FIG. 2 is a side elevational view of the present invention.
Figure 3:
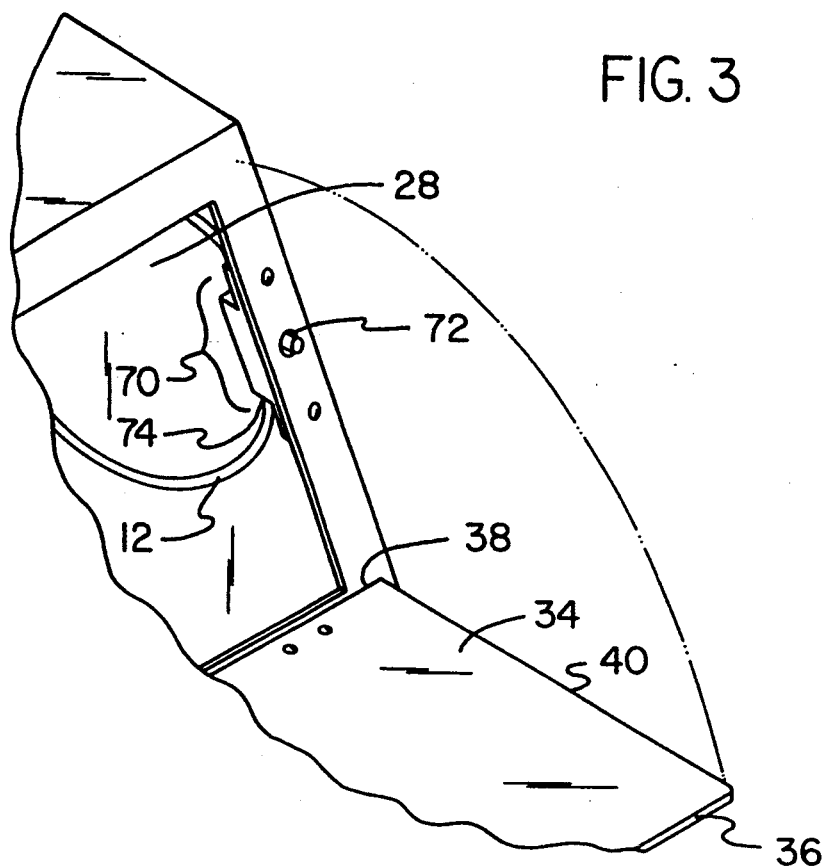
FIG. 3 is an enlarged perspective view of the switch and its relation to the pivotable lid for activating or deactivating the ultraviolet lamp.

With reference now to the drawings, and in particular, to FIG. 1 thereof, the preferred embodiment of the new and improved illuminated bread box embodying the principles and concepts of the present invention and generally designated by the reference number 10 will be described.

Specifically, the present invention includes seven major components. The major components are the container, lid, lamp, power cable, switch, timer, and feet. These components are interrelated to provide the intended function.

More specifically, it will be noted in the various Figures that the first major component is the container 12. The container is rigid, hollow, and generally box-shaped in structure. It has a rectangular and horizontal lower wall 14 and a rectangular and horizontal upper wall 16 positioned thereabove. The container also includes a vertical rear wall 18 and opposed and vertical side walls 20. The container also includes an upwardly extended front wall 22. The front wall has a vertical lower portion 24 and an upper portion 26. The upper portion is extended inwardly at an angle from the lower portion to the upper wall thereabove. The angle formed between the upper and lower portions is between about 100 degrees to about 120 degrees. The upper portion of the front wall has a rectangular opening 28 therethrough. This opening allows bread to be placed within the container. The front wall is angled in a manner for allowing a user to easily view the bread through the opening without having to bend down.

The second major component is the lid 30. The lid is rectangular and rigid in structure. It has an outer surface 32 and an inner surface 34. The lid has a periphery with a top edge 36, a bottom edge 38, and opposed side edges 40. The lid is extended over the opening 28 of the container. The lid is pivotally coupled to the front wall 22 of the container at the juncture of the lower portion 24 with the upper portion 26 thereof. A pair of hinges, each positioned near a lower corner of the lid, is used to perform the pivotal coupling. The opening of the container may now be opened or closed using the lid. Furthermore, with the front wall of the container having the angled structure, the lid may be extendably opened to a greater degree than it could if the front wall were vertical, thereby ensuring that the lid does not block passage of bread through the opening. The lid further includes a lid fastener 42 coupled thereto positioned near the midpoint of the top edge 36. The lid fastener has a knob-like handle 44 extended from the upper surface of the lid. The handle allows the user a firm grip for pivotally moving the lid, whereby opening or closing the container. The lid fastener also has a latch 46 coupled to the inner surface 34 of the lid. The latch is used for securing the lid to the container. The latch is coupled to the handle and through the lid with a bolt 48.

The third major component is the lamp 50. The lamp is disposed within the container and coupled to the upper wall 16 at a location near the rear wall 18. The lamp has a housing and a replaceable bulb. The bulb is adapted for emitting ultraviolet illumination when electrically energized. This ultraviolet illumination inhibits the growth of organisms in and on the bread that leads to its spoilage. The housing and bulb of the lamp are fashioned similar to those used with conventional fluorescent lighting. Commercially available lamp housings like those used with conventional fluorescent lighting may be utilized with the present invention. Furthermore, bulbs emitting other types of light other than ultraviolet light may be utilized as long as this emitted light has the property of inhibiting the growth of organisms in and on bread.

The fourth major component is the power cable 60. The power cable is adapted for providing electrical energy. The power cable has a terminal end 62 extended within the container. The power cable also has a plug end 64 opposite the terminal end and extended remote from the container. The plug end is adapted for coupling with an external electrical power source. In the present invention, this external electrical power source is conventional household power.

The fifth major component is the switch 70. The switch is disposed within the container and coupled to the upper portion of the front wall near the opening. The switch has a depressible button 72 extended through the upper portion of the container at a position such that it can contact the lower surface of the lid when the lid is closed. The switch also has a terminal 74 coupled between the lamp and terminal end of the power source. When the lid is closed, the button portion of the switch is depressed, thereby completing the circuit between the power cable and lamp 50 and energizing the lamp. When the lid is opened, the button is released, thereby breaking the circuit between the power cable and the lamp. Thus, the lamp is de-energized.

The sixth major component is the feet 80. The present invention includes four feet. They are formed of rubber. Each foot is coupled near a corner of the lower wall 14 of the container. Each foot is extended downwards from the container for preventing the container from sliding when held on a surface such as a counter top of a kitchen.

Figure 4:
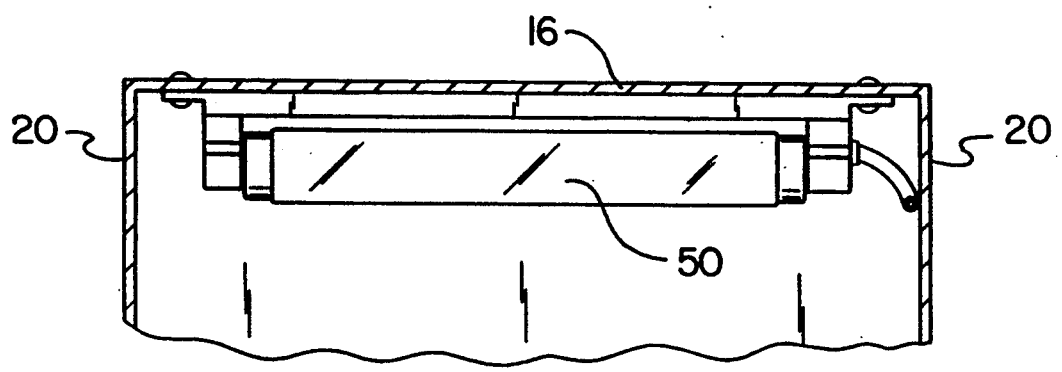
FIG. 4 is a cross-sectional view of the present invention depicting the coupling of the ultraviolet lamp to the upper wall of the container taken along the line 4—4 of FIG. 2.
Figure 5:
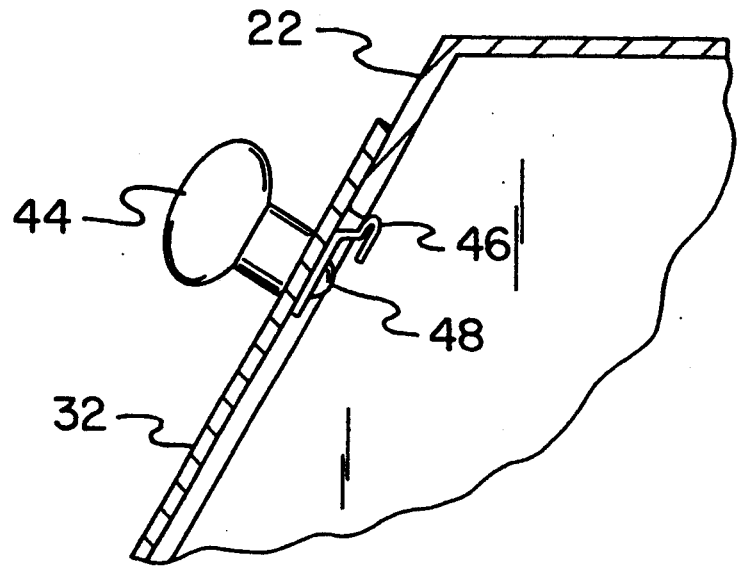
FIG. 5 is a cross-sectional view of the coupling of the lid fastener and its coupling with the lid and the container.
Figure 6:
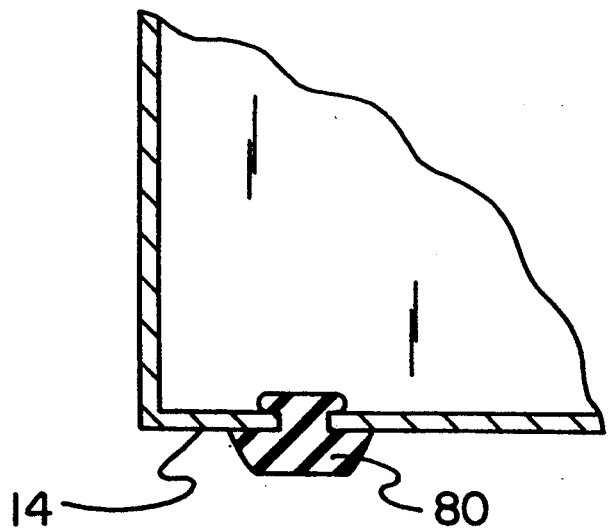
FIG. 6 is a cross-sectional view of the coupling of a rubber foot pad with the lower wall of the container.

A seventh major component is a timer coupled to the light which is used to shut off the light after a predetermined period of time. The timer is preferably of a conventional design and construction and is part of the electrical circuitry in switch 70. Note FIG. 4.

The present invention is a bread box. The present invention is sized to hold at least one loaf of bread. The container is also sized such that it may rest on a conventional counter top in a kitchen. The present invention is superior to other prior art bread boxes in that it will inhibit the growth of organisms that cause bread to spoil. The lamp is of a special wavelength to kill or inhibit the development of the major fungi and organisms which cause destruction of bread and pastries. The lamp is automatically activated or deactivated when the lid is closed and opened, respectively.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An illuminated bread box for holding bread therein and inhibiting its spoilage comprising, in combination:
   a rigid, hollow, and generally box-shaped container having a rectangular and horizontal lower wall, a rectangular and horizontal upper wall, a vertical rear wall, opposed and vertical side walls, and an upwardly extended front wall having a vertical lower portion and an upper portion extended inwardly at an angle from the lower portion to the upper wall with the angle formed between the upper and lower portions being between about 100 degrees to about 120 degrees, the upper portion of the front wall having a rectangular opening therethrough for allowing bread to be placed within the container;
   a rectangular lid having an outer surface and inner surface and a periphery having a top edge, bottom edge, and opposed side edges, the lid extended over the opening of the container with bottom edge thereof pivotally coupled to the front wall at the juncture of the lower portion with the upper portion, the lid further having a lid fastener coupled thereto positioned near the midpoint of the top edge, the lid fastener having a handle extended from the upper surface of the lid for allowing a user a firm grip for opening and closing the opening of the container and a latch coupled to the inner surface of the lid for securing the lid to the container;
   a lamp disposed within the container and coupled to the upper wall at a location near the rear wall, the lamp emitting ultraviolet illumination when electrically energized to inhibit the growth of organisms in and on bread that leads to its spoilage;
   a power cable for providing electrical energy having a terminal end extended within the container and a plug end extended remote from the container for coupling with an external electrical power source;
   a switch disposed within the container and coupled to the upper portion of the front wall, the switch having a depressible button extended through the upper portion at a position for contacting the lower surface of the lid and a terminal coupled between the lamp and power source, whereby when the lid is closed the button portion of the switch is depressed and the lamp is energized, and when the lid is opened, the button is released and the lamp is de-energized; and four rubber feet, each foot coupled near a corner of the lower wall of the container and extended downwards therefrom for preventing the container from sliding when held on a surface.

2. An illuminated bread box for holding bread therein and inhibiting its spoilage comprising:

a hollow container having an opening for allowing bread to be placed therein;

a lamp disposed within the container for emitting illumination when electrically energized to inhibit the growth of organisms in and on bread that leads to its spoilage;

power supply means for providing electrical energy for illuminating the lamp;

a lid extended over the opening and pivotally coupled to the container, thereby allowing the container to be opened and closed; and switch means coupled between the lamp and power supply means and having one orientation for energizing the lamp when the lid is closed and another orientation for de-energizing the lamp when the lid is opened.

3. The illuminated bread box as set forth in claim 2 and further including a timer to shut off the lamp after a predetermined period of time.

4. The illuminated bread box as set forth in claim 2 wherein the power supply means is an electrically conductive cable having a terminal end extended within the container and a plug end extended remote from the container for coupling with an external electrical power source.

5. The illuminated bread box as set forth in claim 2 the lid further having a lid fastener coupled thereto having a handle extended for allowing a user a firm grip for opening and closing the opening of the container and a latch means for securing the lid to the container.

6. The illuminated bread box as set forth in claim 2 further including a plurality of adjustable feet, each foot coupled to the container for preventing it from sliding when held on a surface.

* * * * *